(12) United States Patent
Wiggins

(10) Patent No.: US 6,283,762 B1
(45) Date of Patent: Sep. 4, 2001

(54) BUBBLE PACK TOY CONTAINING COMESTIBLES

(76) Inventor: Warren Morris Wiggins, 5605 Denwood Ave., Baltimore, MD (US) 21206

(*) Notice: Subject to any disclaimer, the term of this patent is extended or adjusted under 35 U.S.C. 154(b) by 0 days.

(21) Appl. No.: 09/579,230

(22) Filed: May 30, 2000

(51) Int. Cl.[7] .......................... G09B 19/00; B65D 73/00; B65D 85/00

(52) U.S. Cl. .......................... 434/236; 434/262; 434/237; 206/541; 206/457; 206/591; 206/594; 446/72; 446/73; 446/76; 426/106; 426/413

(58) Field of Search .................. 446/397, 72, 73, 446/76; 434/236, 385, 387, 378, 393, 262, 237; 206/521, 522, 591, 594, 457, 541, 542; 426/106, 413

(56) References Cited

U.S. PATENT DOCUMENTS

| | | | |
|---|---|---|---|
| 3,006,780 | * 10/1961 | Shaffer. | |
| 4,911,671 | 3/1990 | Rogers | 446/81 |
| 5,067,925 | 11/1991 | West | 446/397 |
| 5,099,991 | * 3/1992 | Kitagawa et al. | 206/328 |
| 5,484,318 | 1/1996 | Mayert | 446/75 |
| 5,681,203 | 10/1997 | Arnold | 446/181 |
| 5,692,834 | 12/1997 | Pagano | 383/9 |
| 5,743,404 | * 4/1998 | Melashenko et al. | 206/524.3 |
| 5,791,476 | 8/1998 | Stekloff | 206/521 |
| 5,795,644 | 8/1998 | Delarosa | 428/178 |
| 5,820,268 | 10/1998 | Becker et al. | 383/99 |
| 5,865,644 | 2/1999 | Martey | 446/397 |
| 6,041,918 | * 3/2000 | Moore | 206/815 |

* cited by examiner

Primary Examiner—Jacob K. Ackun, Jr.
Assistant Examiner—Bena B. Miller
(74) Attorney, Agent, or Firm—Keith S. Bergman

(57) ABSTRACT

A toy peripherally formed of flexible bubble packing material in a shape simulating an object defines an internal cavity that is stuffed with a plurality of relatively smaller pieces of comestible material such as candy to provide a three dimensional shape. The toy is destructible so that a user may gain pleasure not only by reason of ownership and manual manipulation as with any three dimensional toy, but also from manually popping the bubbles of the peripheral covering to create sound and provide an additional manipulative function and from opening the cavity of the toy to gain access to the contained and consuming the comestible. The toy is useful as a placebo in juvenile counseling, psychology, psychiatry and education to alleviate tension and introversion and to gain attention and establish a responsive communicative relationship with the toy user.

3 Claims, 1 Drawing Sheet

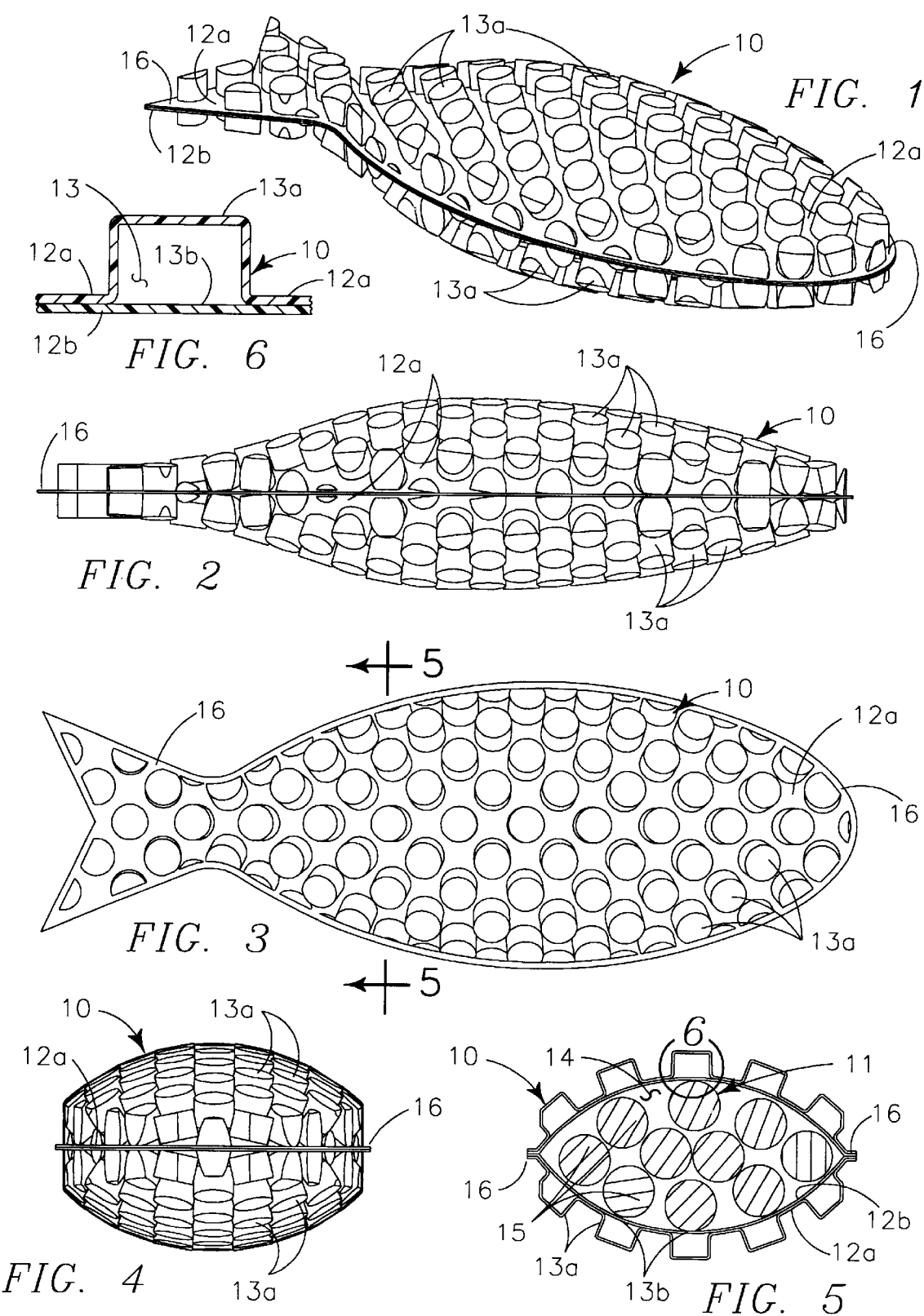

BUBBLE PACK TOY CONTAINING COMESTIBLES

BACKGROUND OF INVENTION

RELATED APPLICATIONS

There are no applications related hereto heretofore filed in this or any foreign country.

1. Field of Invention

This invention relates generally to toys and more particularly to a toy having a peripheral element formed of plastic bubble packing material defining an internal chamber filled with comestible stuffing material for use especially in juvenile counseling, education and psychology.

2. Background and Description of Prior Art

Bubble packing material formed by one or more sheets of flexible material, generally of a polymeric type defining a plurality of spaced gas filled pockets or "bubbles" originated in the fairly recent past for protecting packaged goods of a delicate nature and has gained substantial favor and use in the modern marketplace. Since the material has come into use it has become a popular toy or play article for many people and especially juveniles who gain pleasure and amusement from bursting the gas filled bubbles formed in the material by pressure exerted manually or otherwise. Because of the popularity of bubble packaging material as a toy per se, it, or simulations of it, have come into the marketplace for use as toys.

The destruction of bubbles in bubble packing material appears to have a tension relieving function in the bubble destroyer and the material has been used for this purpose not only by juveniles, but also by adults, as evidence by the existing general and patent literature. The instant invention seeks to provide a toy synergistically combining the amusement and pleasure associated with destroying bubbles in bubble packing material, the long known desirable effects of manual play with resiliently deformable three dimensional toys simulating natural objects and the pleasures of consumption of comestibles or its contemplation to create a toy of general desirability that is especially useful in juvenile psychology, counseling and education.

Dealing with juveniles in psychological, counseling or educational settings is often difficult because of the incomplete development of the patient's cognitive and reasoning functions, the novelty and unfamiliarity with the process and persons involved in it, short attention span and general lack of interest in the proceedings. Since toys are something familiar to and generally desirable by the patient they have been found useful in such work, somewhat in the nature of a placebo, to keep juvenile attention, alleviate fears and tensions and provide a reasonably pleasurable experience, all to aid the productivity of the processes.

My invention resides not in any one of these features or elements individually, but rather in the synergistic combination of all of the elements and structures forming my toy which necessarily give rise to the functions and uses flowing therefrom.

SUMMARY OF INVENTION

My invention provides a three dimensional toy with a configuration simulating a natural object or animal that has a resilient cover formed of bubble packing material enclosing a chamber stuffed with a confectionary or other alimentary product to maintain the three dimensional configuration of the toy. The bubble packing material comprises one or more polymeric sheets defining a plurality of small spacedly related, gas containing chambers that are of such nature that the bubbles can be burst by manual pressure, but yet are configurationally sustaining absent any bursting pressure. The stuffing material comprises some confectionary or other alimentary product that is desirable as a food to please the toy's user and has sufficient bulk to fulfill its stuffing purpose of providing a three dimensional configuration for the toy to simulate the desired form. The bubble packing material or its joined areas are preferably of such nature as to be openable by ordinary manual manipulation without use of tools to allow access to the stuffing material contained in the toy.

In providing such a toy it is:

a principal object to provide a toy formed with a covering of flexible polymeric bubble packing material that defines a chamber carrying a confectionary or other alimentary product desirable to and consumable by a user.

A further object is to provide such a toy that has a three dimensional configuration simulating some natural object or animal that is desirable to a user for manipulatable type play, such as in the case of stuffed animals.

A further object is to provide such a toy having bubble packing material that defines a plurality of small spacedly related gas filled chambers that may be burst by manual pressure exerted by a user's fingers that are interconnected by a flexible membrane that may be torn by manual manipulation without the use of tools to gain access to the comestibles carried in the toy chamber.

A further object is to provide such a toy that synergistically combines the features of its individual elements for use particularly in connection with educational, psychological and counseling work with juveniles to provide pleasurable experiences to a user to aid in relieving tensions in a learning or treatment process to make the process more effective and beneficial than they would have been without use of the toy.

A still further object is to provide such a toy that is of new and novel design, of rugged and durable nature, of simple and economic manufacture and one otherwise well adapted for the uses and purposes for which it is intended.

Other and further objects of my invention will appear from the following specification and accompanying drawings which form apart hereof. In carrying out the objects of my inventions however, it is to be remembered that its accidental features are susceptible of change in design and structural arrangement with only the best known mode of the preferred and practical embodiment being illustrated in the accompanying drawings and specified as is required.

BRIEF DESCRIPTION OF DRAWINGS

In the accompanying drawings which form a part hereof and wherein like numbers of reference refer to similar parts throughout:

FIG. 1 is an isometric view of my toy from an upper lateral aspect.

FIG. 2 is an orthographic left side elevational view of the toy of FIG. 1.

FIG. 3 is an orthographic top view of the toy of FIG. 1.

FIG. 4 is an orthographic front view of the toy of FIG. 1.

FIG. 5 is medial vertical cross-sectional view of the toy of FIG. 3, taken on the line 5—5 thereon in the direction indicated by the arrows.

FIG. 6 is an enlarged cross-sectional view of one of the bubble structures of FIG. 5 shown in circle 6 thereon.

DESCRIPTION OF PREFERRED EMBODIMENT

My toy generally provides peripheral covering 10 defining an enclosed medial chamber containing a confectionary or other alimentary product 11.

As used herein the terms comestible or alimentary products are intended to include various food-like materials some part of which may be ingested but all of which commonly are not ingested such as gum, favored waxes, wrapped or otherwise encased or packaged products and similar material.

Peripheral covering 10 that defines the periphery of my toy is a sheet-like element formed from known packing material commonly called "bubble pack". Bubble pack is commercially available in a variety of forms produced by different manufacturers, but all generally provides the same essential structure of sheet-like matrix or web 12 defining or carrying enclosed gas chambers 13 containing sufficient gas to configurationally maintain the bubble structure. These gas chambers are commonly designated as "bubbles" though the term is not configurationally definitive and the bubbles may be of a variety of shapes.

The web 12 is commonly formed by two adjacent paired sheet-like elements one of which defines the protruding portions 13a of the bubbles and the other of which defines the flat non-protruding surface 13b of the bubbles. Commonly all protruding surfaces 13a are formed by one sheet 12a of body material and a second adjacent sheet 12b is essentially flat without bubble-like protuberances. This common configuration is not a necessary configuration however, and both sheets 12a and 12b may define bubble-like protuberances if desired.

The bubble chambers 13 must be substantially gas impervious to maintain utility of the bubbles as protective elements and by reason of this, the material from which sheets 12a and 12b are formed must be nonporous and impervious to gases, either absolutely or for a long period of time. Similarly the sealing of the adjacent surface between the sheets 12a, 12b and especially about the periphery of bubbles 13 must be gas impervious. Commonly in the present day market such bubble packing material is formed of nonporous plastic sheet of a thermally active nature so that the adjacent areas of the two sheets may be joined by thermal welding which has been found to create a quite satisfactory gas impervious bond.

The body material may be transparent, translucent or opaque and may be colored or colorless. All of these variations of accidental features are within the ambit and scope of my invention, but preferably the material is colorless and translucent or transparent so that a person making use of the toy may observe the material carried within a chamber defined by the periphery covering. Normally the gas carried within bubbles 13 is air, but other gases are operable and it is known generally to use odoriferous or colored gases or gas mixtures in the bubbles to enhance the visually sensed pleasures or provide other than visually sensed pleasure of a user.

The size and configurations of the bubbles may vary and is not critical to the operability of my toy so long as some bubbles exist. Commonly the protruding portions of the bubbles will have a cylindrical or somewhat hemispherical shape and those and other bubble configurations are quite operative with my toy. Normally the pressure of the gas filling the gas chambers 13 is slightly below air pressure so that the protruding surface portion 13a is not too firm or rigid to avoid undesired rupture and to better fit on and about adjacent surfaces of material to be packaged. This bubble structure is operative with my invention so long as sufficient gas pressure is provided in the bubbles to allow rupture by manual manipulation between the fingers of the user, as is the case with most commercial bubble packing material. The sheets 12a and 12b forming the body 12 should be such as to be tearable by manually applied force or stress, though if they are not, weakened portions may be created in the body to allow breaking or tearing at particular areas.

The peripheral covering 10 is formed by one or more pieces of bubble packing material 12a, 12b cut to appropriate peripheral shape and joined in their adjacent edge portions 16 to form a continuous surface defining internal chamber 14. The number and shape of pieces of bubble packing material required to form any particular toy will be determined by the configuration of the toy and is readily determinable by a routineer in the pattern making art. The adjacent edges 16 of each piece of the peripheral covering are overlapped and the adjacent surfaces joined to each other by connecting methods known for the particular material involved, such as by adhesion or thermal welding for polymeric materials.

In the instance illustrated, the particular toy form shown generically simulates a fish with outwardly protruding bubbles 13a somewhat simulating scales of the fish. The particular form is created by joining two similar peripheral covering elements to each other about their adjacent peripheral edges 16 to create a flat, normally outwardly extending, seam. In forming the peripheral edges of the covering, cut bubble surfaces 13a preferably are connected to the surface element 13b to reform a bubble element having an enclosed chamber though this is not necessary and cut bubble elements may merely be left open and uninflated. A convenient method for forming a single perimeter seam as in the fish form illustrated is to use thermal welding as commonly both the seam and closure of any cut bubbles may be accomplished in a single operation.

Comestible product 11 carried in internal chamber 14 defined by peripheral covering 10 comprises some type of an edible material 15 that generally is pleasing to a group of users to which the toy is directed. To effectively fulfill its purpose of stuffing the internal chamber 14 to beget the three dimensional configuration desired for the toy, the edible material 15 should be of a particulate nature and of a reasonably small volume and compact size relative to the size and volume of internal chamber 14.

Preferred products are confections jelly beans, gummy worms and animals, individual packets of chewing gum, wrapped candies and the like. The comestible product is completely sealed in internal chamber 14 to maintain its sanitary condition and aid in maintaining its state at the time of placement. Deterioration is lessened because of the gas impervious nature of the peripheral covering, but nonetheless the comestible product should be chosen to have a reasonably long useful life span to aid storage and merchandising of the product. A fancifully configured product of a brightly colored nature tends to enhance the attractability of the toy if its peripheral convering be transparent or translucent.

The use of a toy formed according to the foregoing specification follows rather naturally from the nature of an intended user. The nature of the toy may be styled to be attractive to particular user groups, though the toy is directed primarily toward use by juveniles generally not beyond adolescence and normally therebelow, as its effectiveness seems to vary somewhat indirectly with user's age. Both the objects simulated and the comestibles contained in the toy may be preselected from items currently popular with the age group of users at which the toy is directed, and this may vary widely with different social groupings, geographical areas and time periods.

For use the toy merely is given to the user and use will normally and naturally follow from that point by reason of the nature of the user. If use does not so develop, the user may be instructed that the toy may be touched, rubbed and played with, that comestible products may be removed and eaten and that bubbles defined in the covering may be manually burst, both before and after opening the internal chamber or emptying the chamber of comestible products. The psychological benefits that the toy may beget for healthcare professionals also flow naturally from use of the toy, generally to the degree possible for individual users. Aside from any psychological benefits the toy may be used merely as any other toy, but provides more pleasurable activity than toys having only one or less than all of its pleasure causing features.

The foregoing description of my invention is necessarily of a detailed nature so that a specific embodiment of its best known mode might be set forth as required, but it is to be understood that various modifications of detail, rearrangement and multiplication of parts might be resorted to without departing from its spirit, essence or scope.

Having thusly described my invention, what I desire to protect by Letters Patent, and

What I claim is:

1. A toy for use as a therapeutic placebo for mental and historical juveniles, comprising in combination:

a flexible peripheral covering formed of bubble pack material having a plurality of spacedly related gas containing bubbles that may be ruptured by pressure exerted by a user, said flexible covering defining an enclosed medial chamber, having a configuration simulating a three dimensional object and being rupturable by manual manipulation to open the medical chamber; and comestible material carried in the medial chamber to expand the flexible covering to simulate in three dimensions the configuration of the object, represented by the toy said comestible material comprising a plurality of separable individual elements.

2. The toy of claim 1 wherein:

the separable elements of comestible material each have a volume not substantially greater than the volume of the gas containing bubbles defined by the peripheral covering.

3. The toy of claim 1 wherein:

the peripheral covering is formed by two adjacent sheets of flexible polymeric material, and the gas containing bubbles are formed partially by each adjacent sheet of polymeric material with adjacent surfaces of the two sheets of polymeric material joined adjacent the surface defining a bubble to form a gas containing bubble chamber.

\* \* \* \* \*